United States Patent
Masutani

(10) Patent No.: US 6,416,423 B1
(45) Date of Patent: *Jul. 9, 2002

(54) PRODUCTION METHOD OF GOLF BALL

(75) Inventor: Yutaka Masutani, Saitama (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/511,897

(22) Filed: Feb. 23, 2000

(30) Foreign Application Priority Data

Feb. 23, 1999 (JP) ............................. 11-044635

(51) Int. Cl.⁷ ................... A63B 37/06; A63B 37/08; A63B 37/04
(52) U.S. Cl. ................... 473/370; 473/371; 473/373; 473/367
(58) Field of Search ................. 473/351, 367, 473/368, 370, 371, 373, 374, 376, 377, 378; 264/250, 278, 319; 425/116

(56) References Cited

U.S. PATENT DOCUMENTS

| | | | |
|---|---|---|---|
| 5,820,485 A | | 10/1998 | Hwang |
| 5,836,834 A | * | 11/1998 | Masutani et al. ........... 473/374 |
| 5,849,237 A | * | 12/1998 | Inoue et al. ................ 264/319 |
| 5,882,567 A | | 3/1999 | Cavallaro et al. |
| 5,984,807 A | * | 11/1999 | Wai et al. .................... 473/376 |
| 6,033,611 A | * | 3/2000 | Yamagishi et al. .......... 264/250 |
| 6,066,054 A | * | 5/2000 | Masutani .................... 473/374 |
| 6,123,534 A | * | 9/2000 | Kasashima et al. ......... 425/116 |
| 6,129,881 A | * | 10/2000 | Puniello .................... 264/278 |
| 6,155,935 A | * | 12/2000 | Maruko ...................... 473/361 |
| 6,168,407 B1 | * | 1/2001 | Kasashima et al. ......... 425/116 |
| 6,213,897 B1 | * | 4/2001 | Masutani et al. ........... 473/378 |
| 6,238,194 B1 | * | 5/2001 | Inoue et al. ................ 425/116 |

* cited by examiner

Primary Examiner—Paul T. Sewell
Assistant Examiner—Alvin A. Hunter
(74) Attorney, Agent, or Firm—Sughrue Mion, PLLC

(57) ABSTRACT

A method for producing a golf ball, including a spherical elastic inner layer having a large number of projections and a thermoplastic resin outer layer covering the inner layer, employs a mold comprising an upper mold and a lower mold with a spherical cavity formed in the inside and a parting surface provided at a position corresponding to an equator of the spherical cavity. A plurality of columnar support pins each have a tip width sufficient for supporting at least two projections on the inner layer, the pins elongating into the cavity reciprocally movably toward the parting surface. The inner layer is supported at the cavity center portion of the mold by the support pins, from above and below at the projection positions. An external layer resin is injected into the space between the inner layer and the cavity wall surface surface, forming the inner and outer layers.

8 Claims, 1 Drawing Sheet

PRODUCTION METHOD OF GOLF BALL

BACKGROUND OF THE INVENTION

1. Field of the Invention

The present invention relates to a method for producing a golf ball with a structure including a spherical elastic inner layer having a large number of projections on the outer surface, and the periphery thereof covered with a thermoplastic resin.

2. Description of the Related Art

As golf balls, a rubber thread type produced by covering a core formed by winding a rubber thread spherically with a balata cover, and a solid type produced by covering a hard rubber spherical core having a high resilience with a resin cover having excellent tear resistance and wear resistance are commonly known. Among them, since the latter one is superior in terms of the flying distance, this type is prevailing among golfers.

However, since the solid golf ball still has points to be improved, such as a relatively hard hit feeling and relative shortage of spinning when hit by a short iron with a large loft, the following improved examples are known.

The first one is a structure with one or two relatively thin resin intermediate layers having a hardness lower than that of a cover, disposed between a core and the cover. The second one is a structure with an intermediate layer having a large number of small projections provided on the outer surface, disposed between a core and a cover. Also in this case, in general, the intermediate layer comprises a resin layer having a hardness lower than that of the cover. Further, the height of the projections is set to be slightly lower than the thickness of the cover in most cases. Accordingly, since the cover material can be disposed among the projections of the intermediate layer, a third layer having a property mixed with those of the cover and the intermediate layer can substantially exist in the small projection portions in the radial direction of the golf ball. Moreover, it is also advantageous in that the physical bond between the cover and the intermediate layer can be reinforced.

Although it is advantageous to bond the layers with different physical properties adjacent with each other via a large number of small projections in a golf ball as mentioned above, it is extremely difficult to produce as mentioned below.

In providing the resin intermediate layer or the resin cover around the rubber core, or in providing the resin cover around the resin intermediate layer, a two-piece mold having a spherical cavity in the inside is used. More specifically, the shaping operation is executed using a mold comprising an upper mold and a lower mold with the parting surface provided at a position corresponding to an equator of a spherical cavity, with the pole sections of the upper mold and the lower mold each provided with a plurality of columnar support pins elongating toward the parting surface reciprocally movably.

That is, a core is set at the center of the cavity by inserting the core or the core covered with an intermediate layer at the center portion of the cavity in the mold, closing the upper mold and the lower mold, and introducing the support pins provided in the upper mold and the lower mold into the cavity from above and below. In this case, if the outer surface of the core or the intermediate layer is smooth, it is easy and certain to hold the core with the support pins, and thus it is set at the center position of the cavity accurately. However, in the case of a core or an intermediate-layer-covered core having a large number of small projections on the outer surface, it cannot be held with the support pins stably, and thus it is liable to be set at a position off the cavity center. If a cover material is injected with the core set at the eccentric position of the cavity, it is apparent that a golf ball lacking the uniformity in terms of the structure and the performance, setting aside the external appearance, is shaped.

SUMMARY OF THE INVENTION

In order to solve the above-mentioned problem, an object of the invention is to provide a method for producing a golf ball having the excellent uniformity using a core having a large number of small projections on the outer surface, or an inner layer comprising an intermediate-layer-covered core.

In order to achieve the above object, according to the invention, there is provided a method for producing a golf ball including a spherical elastic inner layer having a large number of projections with a round shape or a polygonal shape when viewed two-dimensionally on the outer surface, and a thermoplastic resin outer layer covering the inner layer, comprising the steps of: providing a mold comprising an upper mold and a lower mold with a spherical cavity formed in the inside and a parting surface provided at a position corresponding to an equator of the spherical cavity, with pole sections of the upper mold and the lower mold each provided with a plurality of columnar support pins elongating into the cavity reciprocally movably wherein the support pins have a tip width sufficient for supporting at least two projections on the inner layer; supporting the inner layer at a cavity center portion of the mold by the support pins from above and below at the projection positions; and injecting an external layer resin into a space between the inner layer and the cavity wall surface so as to integrally form the inner and outer layers.

As an embodiment of the invention, a structure wherein the inner layer is a rubber core having a large number of projections on the surface, and the outer layer is a resin cover provided with dimples on the surface can be provided.

As another embodiment, a structure wherein the inner layer is a rubber core, and the outer layer includes an intermediate layer provided between the cover and the core can be provided.

As still another embodiment, a structure wherein the inner layer is an intermediate layer having a large number of projections on the surface, disposed on a rubber core can be provided.

It is preferable that the projections are a columnar member having a 0.8 to 3 mm diameter and a 0.3 to 5 mm height.

Moreover, it is preferable that 50 to 500 pieces of the projections are provided substantially uniformly on the outer surface of the inner layer.

Furthermore, it is preferable that at least 3 pieces of the inner layer support pins are provided inside a 12.5 mm radius circle centering on each pole of the upper mold and the lower mold with an equal interval, and it is further preferable that 4 to 5 pieces are provided with an equal interval.

DETAILED DESCRIPTION OF THE PREFERRED EMBODIMENT

Hereinafter, the invention will be described with reference to the drawings.

Figure 1:
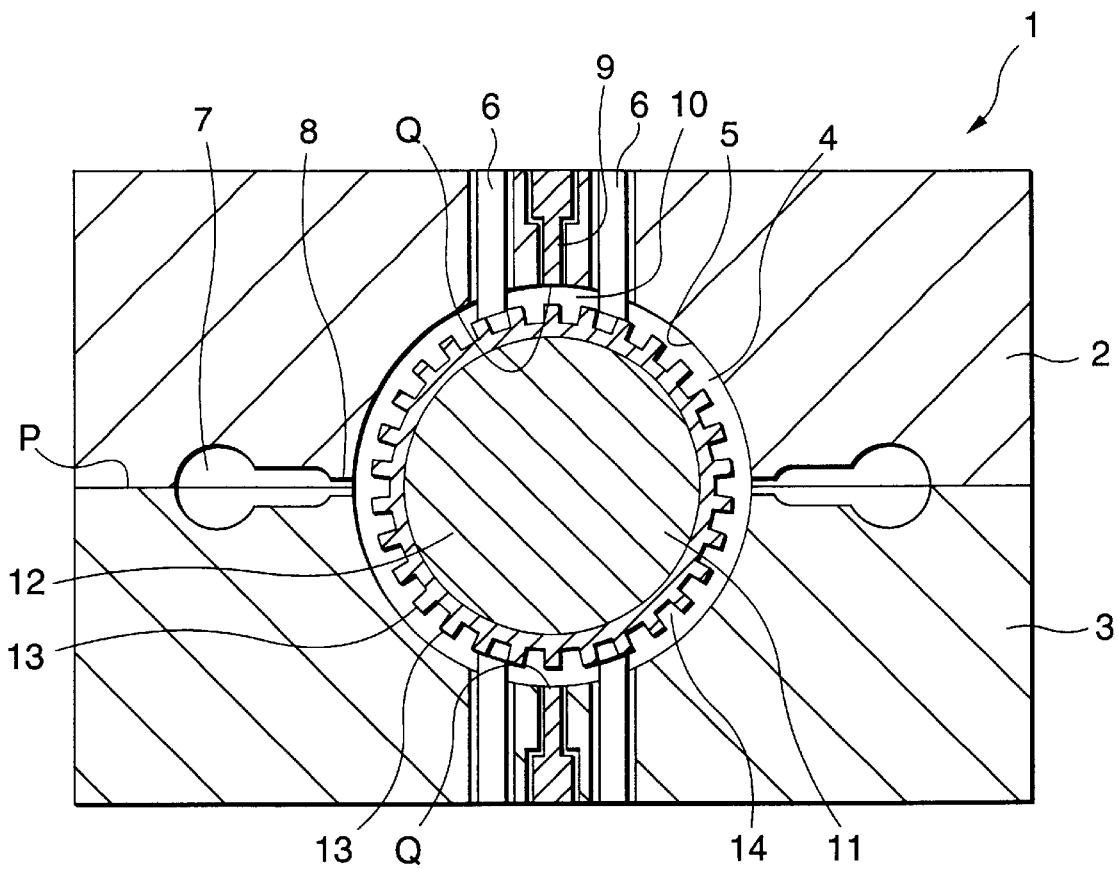
FIG. 1 is a cross-sectional view of a golf ball mold to be used preferably in the invention.
Figure 2:
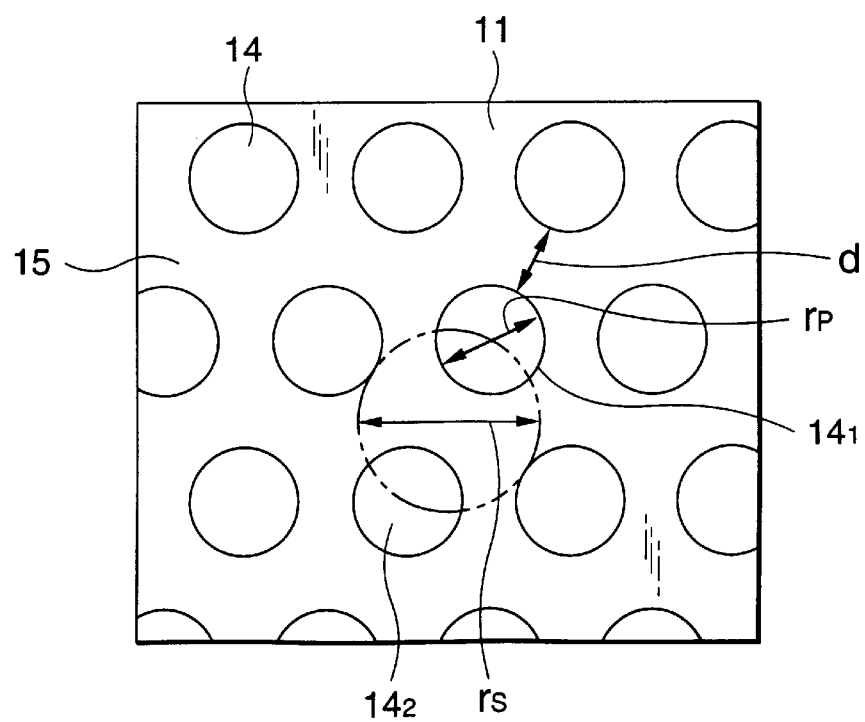
FIG. 2 is an enlarged plan view of an inner layer at the pin portion of FIG. 1.

FIG. 1 is a cross-sectional view of a golf ball mold to be used preferably in the invention. FIG. 2 is an enlarged plan view of an inner layer at the pin portion of FIG. 1.

In FIG. 1, a mold 1 comprises an upper mold 2 and a lower mold 3, with a spherical cavity 4 formed therein. A large number of projections (not illustrated) are provided on a wall surface 5 of the cavity 4 for shaping dimples. The parting surface P of the upper mold 2 and the lower mold 3 is provided at a position corresponding to an equator of the cavity 4. At least 3 pieces of columnar support pins 6 are provided inside a 12.5 mm radius circle centering on the pole Q of the upper mold 2 and the lower mold 3 in the direction perpendicular to the parting surface P reciprocally movably into the cavity. In this embodiment, a mold provided with 4 support pins 6 disposed with an equal interval and circumscribed by a 12.0 mm radius circle is used.

In FIG. 1, the same projections as the dimple shaping projections provided on the cavity wall surface 5 are formed on the tip portions of the support pins 6.

A runner 7 for resin supply is provided at the parting surface P, surrounding the cavity 4. A plurality of gates 8 are provided communicating therewith with a certain interval (in this embodiment, they are provided at 8 points with an equal interval on the circumference).

Reference numeral 9 denotes an exhausting means provided at the positions of both poles Q.

In FIG. 1, an inner layer 11 is set at the center position of the cavity 4 of the mold by the upper and lower support pins 6. In the embodiment, the inner layer 11 comprises a hard rubber core 12 disposed at the center and a resin intermediate layer 13 superimposed concentrically thereon, with the outer surface of the intermediate layer 13 provided with columnar projections 14. In this embodiment, the projections 14 have a 1.0 mm diameter ($r_p$) and a 1.0 mm height. They are provided at about 300 points substantially uniformly.

In FIG. 2, the support pins should have a diameter ($r_s$) or a width sufficient for always supporting at least two adjacent projections 141, 142 on the inner layer 11. Here, the diameter or the width sufficient for always supporting two adjacent projections denotes a diameter or a width of the support pins 6 capable of contacting at least partially with the projection 141 and the projection 142 adjacent thereto. Therefore, in the case the interval between the adjacent projections (shortest distance) d is, for example, the same as the diameter $r_p$ of the projection, the diameter $r_s$ of the support pins should be the same as $2r_p$ or more. The diameter $r_p$ the support pins can be smaller by having the diameter $r_s$ of the projections set relatively small within the above-mentioned 0.8 to 3 mm range, and the interval between the projections (shortest distance) d relatively small, for example, smaller than the diameter $r_p$ of the projections. In this embodiment, the diameter $r_s$ of the support pins is 3.2 mm.

According to the above configuration, the inner layer 11 can be set certainly on the upper surface of the projections at the center position of the cavity 4 by the support pins 6.

Thereafter, by injecting a thermoplastic resin as the cover material into the space between the inner layer 11 and the cavity wall surface 5 by an ordinary method, shaping operation of the golf ball is completed.

In the case an intermediate layer 13 is used in the inner layer 11, the thickness of the intermediate layer including the projections is preferably 0.5 to 5 mm.

In the case the inner layer 11 is simply a core 12 without an intermediate layer, the projections 14 should be provided on the surface of the core 12 according to the above-mentioned manner.

In the case of the structure according to the invention comprising the core 12, the intermediate layer 13 and the cover shown in FIG. 1, as to the hardness of the core, a 2 to 6 mm deformation amount of the core subject to a 100 kg load application is preferable. It is preferable that the intermediate layer and the cover have 25 to 65° and 45 to 65° Shore D hardness, respectively, with the hardness of the intermediate layer set at a level lower than that of the cover. In this embodiment, the hardness (deformation amount) of the core is 4 mm, and the hardness of the intermediate layer and the cover is 40° and 60°, respectively. Further, in the case of the structure comprising a core and a cover, the deformation amount of the core is preferably 2 to 6 mm, and the hardness of the cover is preferably 45 to 65°.

The shape of the projections 14 is not limited to a column, but polygonal prisms such as a quadrilateral prism, a pentagonal prism and a hexagonal prism, and tapered projections having a flat surface at the vertex, such as a frustum of a cone and a frustum of a pyramid can also be used. Further, as long as the object of the invention is achieved, other shapes such as a cone, a polygonal pyramid and a hemisphere can also be used.

According to a production method of the invention, a golf ball including a spherical elastic inner layer having a large number of projections with a round shape or a polygonal shape when viewed two-dimensionally on the outer surface, and a thermoplastic resin outer layer covering the inner layer can be produced extremely advantageously in terms of the uniformity.

What is claimed is:

1. A method for producing a golf ball, the golf ball including a spherical elastic inner layer having a large number of projections with a round shape or a polygonal shape when viewed two-dimensionally on its outer surface, and including a thermoplastic resin outer layer covering the inner layer, the method comprising:

providing a mold, comprising an upper mold and a lower mold, with a spherical cavity formed in the inside and with a parting surface provided at a position corresponding to an equator of the spherical cavity, with pole sections of the upper mold and the lower mold each being provided with a plurality of columnar support pins, the support pins elongating into the cavity reciprocally movably, the support pins each having a tip width sufficient for supporting at least two projections on the inner layer;

supporting the inner layer at a cavity center portion of the mold with the support pins, from above and below at positions of the projections; and injecting an external layer resin into a space between the inner layer and the cavity wall surface so as to integrally form the inner and outer layers.

2. The method for producing a golf ball according to claim 1, wherein the inner layer is a rubber core, and the outer layer is a cover provided with dimples on its surface.

3. The method for producing a golf ball according to claim 1, wherein the inner layer is a rubber core, the outer layer includes a cover provided with dimples on its surface, and an intermediate layer is provided between the cover and the core.

4. The method for producing a golf ball according to claim 1, wherein the inner layer includes a rubber core, and a resin intermediate layer is disposed on the core.

5. The method for producing a golf ball according to claim 1, wherein the projections are columnar members each having a 0.8 to 3 mm diameter and a 0.3 to 5 mm height.

6. The method for producing a golf ball according to claim 1, wherein 50 to 500 pieces of the projections are provided on the outer surface of the inner layer.

7. The method for producing a golf ball according to claim 1, wherein at least 3 pieces of the support pins are provided inside a 12.5 mm radius circle centered on each pole of the upper mold and lower mold, with a substantially equal interval between ones of the support pins.

8. The method for producing a golf ball according to claim 7, wherein 4 pieces of the support pins are provided.

* * * * *